United States Patent [19]

Kerman et al.

[11] 3,909,552

[45] Sept. 30, 1975

[54] CONFERENCE CALL CIRCUIT FOR USE IN A KEY TELEPHONE SYSTEM

[75] Inventors: Stephen E. Kerman, Merrick, N.Y.; Tsuyoshi Shinoi; Tsutomu Kataoka, both of Kawasaki, Japan

[73] Assignees: Nippon Tsu Shin Kogyo K.K., Japan; TIE/Communications, Inc., Stamford, Conn.

[22] Filed: Oct. 9, 1973

[21] Appl. No.: 404,204

[52] U.S. Cl. .............. 179/99; 179/1 CN; 179/18 BC

[51] Int. Cl.$^2$ .............. H04M 1/00

[58] Field of Search .............. 179/99, 1 CN, 18 BC

[56] References Cited

UNITED STATES PATENTS

| | | | |
|---|---|---|---|
| 2,975,237 | 3/1961 | Abbott | 179/99 |
| 3,331,924 | 7/1967 | Reaves | 179/99 |
| 3,497,631 | 2/1970 | Pearce et al. | 179/18 BC |
| 3,502,817 | 3/1970 | Westerlund et al. | 179/18 BC |
| 3,504,130 | 3/1970 | Gorgas et al. | 179/18 BC |
| 3,725,601 | 4/1973 | Jetzt et al. | 179/99 |

*Primary Examiner*—Kathleen H. Claffy
*Assistant Examiner*—Gerald L. Brigance
*Attorney, Agent, or Firm*—Kenyon & Kenyon

[57] ABSTRACT

A circuit means is disclosed for use in a key telephone system permitting the connection of a key telephone set to a plurality of central office or PBX line circuit means through the key telephone set and without making a direct parallel connection between the central office or PBX line circuit means. Means are also disclosed permitting the connection, and disconnection of the central office or PBX line circuit means to the key telephone set without requiring the connection and disconnection of the line circuit means by the central office or PBX.

8 Claims, 2 Drawing Figures

CONFERENCE CALL CIRCUIT FOR USE IN A KEY TELEPHONE SYSTEM

BACKGROUND OF THE INVENTION

The invention is related to a key telephone system and, more particularly, to a circuit means for use in a key telephone permitting conference calls between a key telephone set and a plurality of telephones connected to at least two central office line circuits.

In key telephone systems the ability to connect a key telephone to a plurality of parties on central office line circuits is a desired feature.

Further, the conference connection should be made without a direct parallel connection between the lines and to increase the flexibility of a key telephone system, the conference connection and disconnection of the central office line circuits should be controlled by the individual key telephone connected on the conference call.

Finally, these features should be available without major changes in the key telephone apparatus itself and without significantly affecting the cost of the system.

Therefore it is an object of the present invention to provide means for conferencing two central office lines without making a direct parallel connection between the lines.

It is a further object of the invention to accomplish this in a manner which will permit the conferencing parties to be connected or disconnected from each other without being disconnected by the central office.

It is a further object of the invention to provide these functions on an optional basis without significantly affecting the cost of the telephone sets on which the functions are not provided. The present invention accomplishes these objectives.

SUMMARY OF THE INVENTION

In the present invention, means are provided for connecting the telephone speech network circuit of a key telephone set to central office or PBX line circuit means, placing the first line circuit on hold, connecting the network circuit to a second central office or PBX line circuit means, holding the second line circuit means, releasing both line circuit means and connecting both line circuit means to the key telephone to permit a conference call between the users of the two line circuits and the key telephone set.

Additionally means are provided which permit the key telephone user to disconnect both line circuits or, alternatively, to disconnect either of the line circuits without disconnecting the other line circuit from the key telephone set.

BRIEF DESCRIPTION OF THE DRAWINGS

The invention, as well as its objects and features will be better understood by reference to the following detailed description of the preferred embodiment of this invention taken in conjunction with the accompanying drawings in which.

DESCRIPTION OF THE PREFERRED EMBODIMENT

Figure 1:
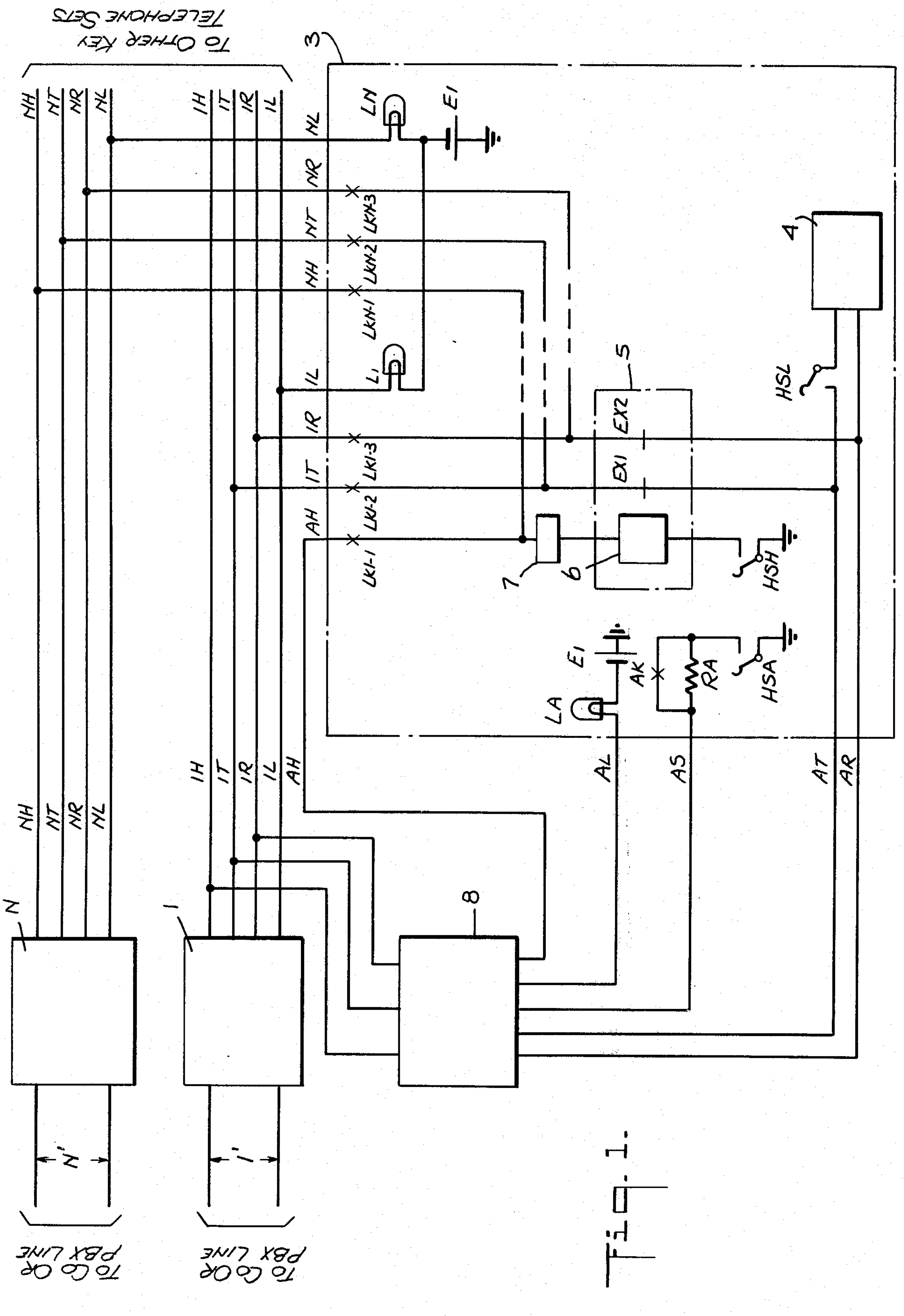
FIG. 1 is a circuit diagram of a key telephone system illustrating the connection of the preferred embodiment conference call circuit of this invention within a key telephone system.

As shown in FIG. 1, a conventional central office line circuit 1 in a key telephone system controls the operation of the visual and audible signals used to indicate the status of the line circuit. The line circuit 1 is also used to place the central office CO, or PBX line in the holding condition, and therefore each central office line has a central office line circuit 1 connected to it. For purposes of explanation 1 and N are shown as typical examples of central office line circuits with 1 representing the first and N representing the nth, among a plurality of identical central office lines and central office line circuits. Central office line 1′ and N′ are connected to the key telephone system by their respective central office line circuits, 1 and N. A conventional key telephone set 3 in the key telephone system is connected to each of the office line circuits 1 . . . N by four conductors, T, R, H and L. 1T and 1R are speaking conductors for line circuit 1 and are connected to the telephone network of each telephone set (here shown by example in FIG. 1 through key telephone 3), by its respective line selection key contacts LK1-2 and LK1-3 and hookswitch contact HSL. The office line circuit control conductor 1H is used to control the status of the line circuit from the telephone set 3. It is important to note that when the office line circuit 1 is in the speaking condition, the 1H lead is connected to ground at the telephone set engaged in conversation and when the office line circuit 1 is in the hold state the 1H lead is disconnected from ground. Conductor 1L is used to light lamp L1 to display visibly the status of the office line eg. speaking, idle, holding, or incoming call at the telephone sets. The lamp power source is E1. NT, NR, NH and NL are conductors associated with line circuit N and corresponding respectively to conductors 1T, 1R, 1H, and 1L of line circuit 1. Line circuit selection key contacts LK1-1, LK1-2 and LK1-3 are all closed simultaneously by the operation of line key 1. Line key contacts LKN-1, LKN-2 and LKN-3 operate in the same manner when line key LKN is operated, and perform a corresponding function for line circuit N.

An automatic exclusion circuit 5 is included within key set 3 and, for example, may be of the type disclosed in the copending U.S. Pat. application Ser. No. 348,313, filed Apr. 5, 1973, in the name of Kengo Sudoh and Mikihiro Ichikawa entitled, "An Automatic Exclusion Circuit For A Key Telephone Set". The control circuit of the automatic exclusion circuit is indicated at 6. Automatic exclusion circuits are desired since, characteristically, all telephone sets in a key telephone system are connected in parallel, it is generally possible for any telephone set in the system to connect to a line already in use by another telephone set. Automatic exclusion circuit 5, as described in the copending patent application, prevents additional key telephone sets from connecting to a line which is already in use by another set. When an attempt is made to connect to a busy line by operating the corresponding line key, ground from the H lead of the selected line is extended into the automatic exclusion control circuit 6 by contact 1 of the appropriate LK. Ground connected to control circuit 6 by hook-switch contact HSH causes the exclusion control circuit 6 to operate its EX relay (not shown), opening contacts EX1 and EX2. Contacts EX1 and EX2 open the path through hookswitch contact HSL to the telephone circuit transmission network 4, preventing connection of the network to the busy selected line.

When an attempt is made to connect to an idle line by pressing the corresponding LK key, the ungrounded potential of the H lead of the selected line appears at automatic exclusion control circuit 6. The EX relay in automatic exclusion circuit 5 remains released in response to this ungrounded potential and speech network 4 is thereby connected to the T and R conductors of the selected line through hookswitch contact HSL. Automatic exclusion control circuit 6 then extends the ground from contact HSH through contact 1 of the operated line key LK to the H lead of the selected line, thereby preventing additional sets from connecting to the line. The EX relay remains unoperated so that connection to the line is maintained.

A hold circuit 7 operated by a hold key (not shown) is also used in the system. If the hold key is operated while an office line 1' . . . N' is in use, the office line in use by that set is signalled to place a holding bridge across the office line. When the hold key is released, the previously operated line key LK corresponding to the line being held is also released.

The conference circuit 8 of the present invention shown in FIG. 1 has line conductors AT and AR corresponding to the T and R conductors of the particular line selected by the operation of a line key LK, at telephone set 3. AK is the make contact of a conference key which is used to turn the conference circuit 8 on and off. Resistance RA, connected across contact AK, serves to hold the conference circuit 8, in a manner which will be explained in detail below. Lamp LA, operated over conductor AL, is used to indicate the on or off status of the conference circuit 8. Hookswitch contact HSA is used in conjunction with contact AK and resistor RA to control the operation and release of the conference circuit 8. The conductor from contact LK1-1 of telephone set 3 is connected to the AH conductor of conference circuit 8. The conductor from contact LK1-1 is basically the 1H conductor of telephone set 3. When conference circuit 8 is in the idle condition, the AH leads and 1H leads are connected together internally, so that the 1H conductor of telephone set 3 connects to the 1H conductor of CO line circuit 1 in a manner similar to the 1H conductors of all other key telephone sets except that the 1H conductors of the other key telephone sets are connected directly. The line keys in each key telephone set are arranged in a conventional manner so as to prevent the operation of two keys simultaneously, resulting in connection of the telephone set to two lines. It is well known to those skilled in the art that this is done to prevent parellel connection to two central office lines.

The circuit of this invention operates in the following manner:

When a call is received through line N, the user of telephone set 3 operates line key LKN closing contact LKN-1, LKN-2, LKN-3, and lifts the handset to operate the hookswitch contacts HSL, HSA, HSH. If the user then wishes to establish a conference connection, this is accomplished by first operating hold key 7, placing office line N on hold. Detailed description of the holding operation is omitted since line circuits 1 and N are conventional line circuits familiar to those skilled in the art and detail of the holding operation is not relevant to the present invention. The user of the key telephone set 3 then operates line key LK1, whereupon dial tone is connected by the central office over line 1'. The third party is called through office line 1' and the call is then placed on hold by operation of line key LKN reconnecting the key set 3 to line N'. Key AK is then momentarily operated causing conference circuit 8 to turn on. Conference circuit 8 places a DC bridge across conductors 1T and 1R and places ground on conductor 1H to reseize CO line circuit 1' and hold the central office connection. Conference circuit 8 then completes a voice connection between the 1T, 1R conductors and the AT, AR conductors. In response to the ground placed on conductor 1H by conference circuit 8, line circuit 1 places ground on the 1L lead causing line lamps L1 at all stations to indicate that the line is busy. The conference circuit places ground on the AL conductor to light lamp LA at key set 3. The parties connected through the office line circuits N and 1 and the inside party using station 3 are now able to conduct a conference call.

The conference call may be terminated by any one of the following three ways:

1. When conversation with parties on both lines N and 1 is no longer desired, the user of key set 3 operates the hookswitch opening contacts HSA, HSH, HSL. The opening of contact HSL causes the party connected through office line circuit N to be disconnected, and the opening of contact HSH restores line circuit N to the idle condition, extinguishing line lamp LN at all stations. The opening of contact HSA restores conference call circuit 8 to its idle condition, releasing line circuit 1 and the party connected through office line 1, restoring line circuit 1 to its idle condition, and extinguishing line lamps L1 at all stations.

2. If the user of key telephone set 3 wishes to continue speaking with the party connected to office line N' but desires to disconnect the party connected to office line 1', this is accomplished by again pressing the AK key, causing the AK contact to close for a second time. This second operation of contact AK turns off conference circuit 8, releasing the party connected through office line 1', releasing office line circuit 1 and extinguishing line lamp L1 at all sets.

3. If the user of key telephone set 3 wishes to continue speaking with the party connected to office line 1', this may be accomplished by simply pressing the LK1 line key on telephone set 3. The operation of LK1 releases LKN, disconnecting network 4 from line N' and reconnecting it to line 1'. Ground from hookswitch contact HSH extended by exclusion control circuit 6 through hold circuit 7 and line key contact LK1-1 to the AH lead to conference circuit 8 causes conference circuit 8 to turn off, thereby reconnecting the AH and 1H leads of conference 8 together. This extends the ground from the 1H lead of telephone set 3 to the 1H lead of office line circuit 1, maintaining the busy indication for line circuit 1 at all stations.

It should be noted here that during the time that conference circuit 8 is connected to office line circuit 1, conference circuit 8 is placing ground on the 1H lead as previously mentioned. This prevents the connection of any telephone set other than telephone set 3 to line circuit 1. Telephone set 3 is able to connect to line circuit 1 because the 1H lead of telephone set 3 is connected to the 1H lead of line circuit 1 through the conference circuit 8 instead of being connected directly as the other telephone sets are. The AH lead of conference circuit 8 is connected to an ungrounded potential while the conference circuit is on, permitting station set 3 to connect. Thus proper operation of the privacy circuits, 5, in all telephone sets is obtained and privacy is maintained on line 1 when connection to the line is made through conference circuit 8, while at the same time key telephone set 3 retains exclusive access to the line.

Figure 2:
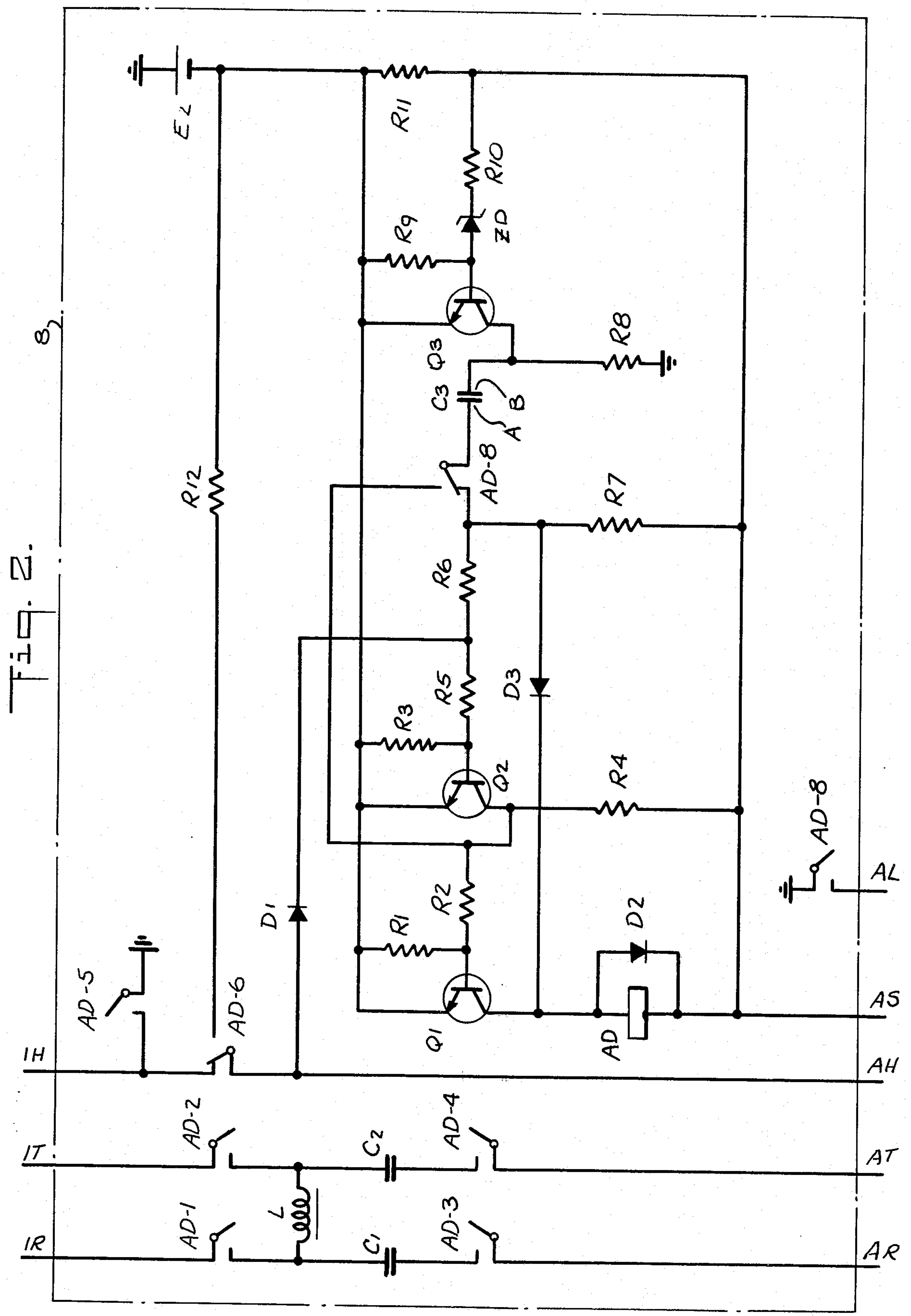
FIG. 2 is an internal circuit diagram for the preferred embodiment of a conference call unit useful in connecting the key telephone system to a plurality of central office or PBX line circuit means in a conference call mode.

The internal operation of the conference circuit 8 of the present application will now be explained in detail with reference to FIG. 2. AD-1 to AD-8 represent contacts on relay AD. Diode D2, connected across the coil of relay AD, protects transistor Q1. ZD is a zener diode having a breakdown voltage such that it passes current when a direct ground is applied to line AS through resistor RA in telephone set 3, the voltage at the cathode of ZD is insufficient to cause a breakdown in the diode due to the voltage division between resistors RA and R11. Transistors Q1 and Q2 are arranged in a flip-flop circuit so that when one transistor is on, the other is always off.

When hookswitch contact HSA in telephone set 3 is closed, ground is supplied to the AS lead through resistor RA whose value is selected to limit the current flow to a value insufficient to permit operation of the relay AD. Once relay AD is operated, however, it may be held through resistor RA. Zener diode ZD is not conducting at this time, and therefore transistor Q3 is off. Consequently, capacitor C3 is charged with the positive polarity on the B lead and a negative on the A lead through a circuit consisting of ground, resistor R8, capacitor C3, break contact AD-8, resistor R6, resistor R5, the base-emitter junction of transistor Q2, and power source E2.

When the AK contact is closed, placing direct ground on the AS lead, zener diode ZD conducts and transistor Q3 turns on. Since capacitor C3 is charged as previously described, the A side of capacitor C3 becomes minus with respect to the emitter of transistor Q2 when transistor Q3 turns on. This cuts off transsitor Q2, and permits base current to flow from the AS lead through resistors R4 and R2 and the base-emitter junction of transistor Q1, turning on transistor Q1. Since, at this time, direct ground is present on the AS lead, sufficient current is available to operate relay AD. The value of C3 is chosen so that its charge and discharge times are much shorter than the operate and release times of relay AD. During the interval between the time when transistor Q1 is turned on and the time when relay AD operates, C3 discharges and recharges through resistor R7 to a voltage equal to the forward voltage drop across diode D3. When AD operates, the positive A lead of C3 is connected through the make contact of AD-8 to the collector of transistor Q2. Since A is positive, the operation of the AD-8 contact does not cause transistor Q1 to be turned off. When contact AK opens by the release of the AK key, ground through resistor RA remains on the AS lead. Current flow through zener diode ZD stops, turning off transistor Q3. Current flows through resistor RA, relay coil AD, and transistor Q1 collector to emitter junction. Current also flows from the AS lead, through resistor R7, diode D3, and the collector and emitter junction of transistor Q1. Current flow from the AS lead through resistor R4, resistor R2, and the base and emitter of transistor Q1 maintains Q1 turned on. Since there is no base current flow in transistor Q2, Q2 remains off and Q1 remains on. Capacitor C3 charges with lead A negative through the base-emitter of transistor Q1 and resistor R2, and with lead B positive through resistor R8. Relay AD made contacts AD-1 and AD-2 connect coil L across the 1R and 1T conductors of office line circuit 1, providing a holding bridge for the central office or PBX line. AD make contacts AD-3 and AD-4 connect capacitors C1 and C2 to provide a speech path between the 1T and 1R conductors of office line 1 and office line selected by the line key of telephone set 3 through the AT and AR conductors. Make contact AD-5 connects ground to the 1H lead so as to provide a busy indication to line circuit 1. Make contact AD-7 lights the LA lamp by the AL conductor.

If, while the conference circuit is turned off, direct ground is placed on the AS lead at a time when office line 1 is in use by another telephone set, ground will be present on the 1H lead. Current will therefore flow from ground on the 1H lead, through diode D1, resistor R5, and the base-emitter junction of transistor Q2, turning on transistor Q2 which prevents transistor Q1 from turning on. This prevents operation of the AD relay. Consequently, use of conference circuit 8 as a means of gaining access to a busy office line circuit, and bypassing privacy circuit 5, is prevented. As can be seen in FIG. 2, when the AD relay is released, the 1H and AH leads are connected directly together so that key set 3 can connect to office line circuit 1 in a conventional manner.

To break the conference connection, the AK contact is closed for a second time as described previously. This causes current flow through zener diode ZD and turns on transistor Q3. Since lead A of capacitor C3 is now negative, and lead B positive, turning on transistor Q3 causes lead A of capacitor C3 to become negative with respect to the emitter of transistor Q1. Current flow to the base of transistor Q1 from resistor R4 is momentarily diverted to capacitor C3, turning off transistor Q1. This makes base current available to transistor Q2 through resistors R7, R6, and R5, which turns on transistor Q2 and prevents transistor Q1 from turning on again after C3 has recharged. The AD relay releases, disconnecting the party on office line 1′ and restoring office line circuit 1 to the idle condition. The user of key telephone set 3 may now continue conversing with the caller on office line N′.

If, as previously described, the user of telephone set 3 had wished to continue conversing with the party on office line 1′, and to disconnect the party on office line N′, this could have been accomplished by reoperating line key LK1. The reoperation of line key LK1 connects the AH lead of conference circuit 8 to privacy control circuit 6 through hold circuit 7. The negative potential of E2 appears on the 1H lead through resistor R12 and the AD-6 make contact. In response to this negative potential, privacy control circuit 6 prevents the operation of the EX relay and extends ground from the HSH contact to the 1H lead. This ground, through diode D1 in conference circuit 8, turns on transistor Q2 by supplying base current through resistor R5. Transistor Q2 turns off transistor Q1, releasing relay AD and transferring the AH lead and 1H lead of the key telephone set 3 to the 1H lead of office line circuit 1. Ground from privacy control circuit 6, through hold circuit 7 and line key contact LK1-1, is extended over the 1H, AH leads to conference circuit 8 and to the 1H lead of office line circuit 1, keeping office line circuit 1 in a busy condition. Release of the AD relay opens contacts AD-1, AD-2, AD-3 and AD-4, removing the speech bridge and holding bridge from across office line 1. A direct connection to network 4 of telephone set 3 is established through contacts EX1, EX2, LK1-2 and LK1-3 to the 1T and 1R conductors of office line circuit 1, permitting conversation between the party on office line 1' and the user of key telephone set 3. The LA lamp is extinguished by the opening of contact AD-7.

Thus, by use of the present invention, it is possible for a key telephone set in a key telephone system to converse simultaneously with two different office lines, one predetermined line, and one line selected by the operation of a line key in the key telephone set, this conference being initiated, ended, and supervised by a momentary, single contact key and a lamp at the key telephone set.

It is further possible by a single operation to discontinue the conference connection and continue conversation with either of the two parties participating in the conference call. It is also possible to disconnect both parties simultaneously by a simple operation of the hookswitch at the key telephone. Furthermore, all of this is accomplished without modification of any of the non-conference telephone sets in the key telephone system. The modifications required in the conference sets, the provision of a single made-contact nonlocking key, a resistor, a lamp and a hookswitch contact, will have only a small effect on those telephone sets being modified.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

We claim:

1. A conference call circuit for use in a key telephone system having a plurality of central office line circuits and at least one key telephone set with a telephone speech network circuit, in which the system is adapted to connect to and hold a first line circuit means while connecting a second line circuit means to the key telephone speech network, the conference call circuit means comprising:

- a relay circuit means for connecting and disconnecting the speech network circuit of the key telephone to the second line circuit means,
- a relay control means for controlling the operation and release of the relay, comprising a non-locking key means in combination with a first semiconductor switching means responsive to said non-locking key means, and a second semiconductor switching means, responsive to the output of said first semiconductor switching means, the output of said second semiconductor switching means controlling the operation and release of the relay, said relay means having a plurality of contacts for connecting the key telephone set to the second line circuit means,
- said relay control means operating the relay means when the key means is depressed to contact a holding circuit means and a speech path circuit means to the second line circuit means, and
- said relay control means releasing the relay means when the key means is depressed a second time to disconnect the holding circuit means and the speech path circuit means from the second line circuit means.

2. A conference call circuit as in claim 1 further comprising

- means, responsive to the operation of a key switching means, for maintaining the connection between the key telephone set and the second line circuit means when the key telephone set is disconnected from the first line circuit means.

3. A conference call circuit as in claim 1 further comprising

- means responsive to the operation of a hookswitch means, for disconnecting the key telephone set from both said first and second line circuit means.

4. A conference call circuit as in claim 1 further comprising

- means responsive to the connection of the key telephone set to both said first and second line circuit means for indicating at all key telephones in the system the busy status of said first and second line circuit means.

5. A conference call circuit as in claim 1 wherein the first semiconductor switching means comprises a transistor switching circuit and a zener diode circuit, said zener diode conducting upon the operation of the non-locking key means and said transistor switching circuit switching in response to the conduction of said zener diode.

6. A conference call circuit as in claim 5 wherein said second semiconductor switching means is comprised of two transistor circuits arranged in a flip-flop circuit, and having said relay means connected to the collector of one of said transistor circuits, whereby the relay operates and releases in response to the conduction and non-conduction of said first transistor circuit, and said first transistor circuit conducts and stops conducting in response to the conduction of said zener diode.

7. A conference call circuit as in claim 5 further comprising circuit means connected to said relay circuit means and responsive to a signal from said second line circuit means indicative of the busy condition of said second line circuit means for preventing the operation of the relay circuit means when said second line circuit means is in use by another key telephone set.

8. A conference call circuit as in claim 7 wherein the means for preventing the operation of the relay circuit means is connected to the second semiconductor switching circuit, said second semiconductor circuit thereby being responsive to the busy condition of the line circuit means and preventing the operation of the relay when said line circuit means is busy.

* * * * *